1,349,117.
Aug. 10, 1920.
2 SHEETS—SHEET 1.
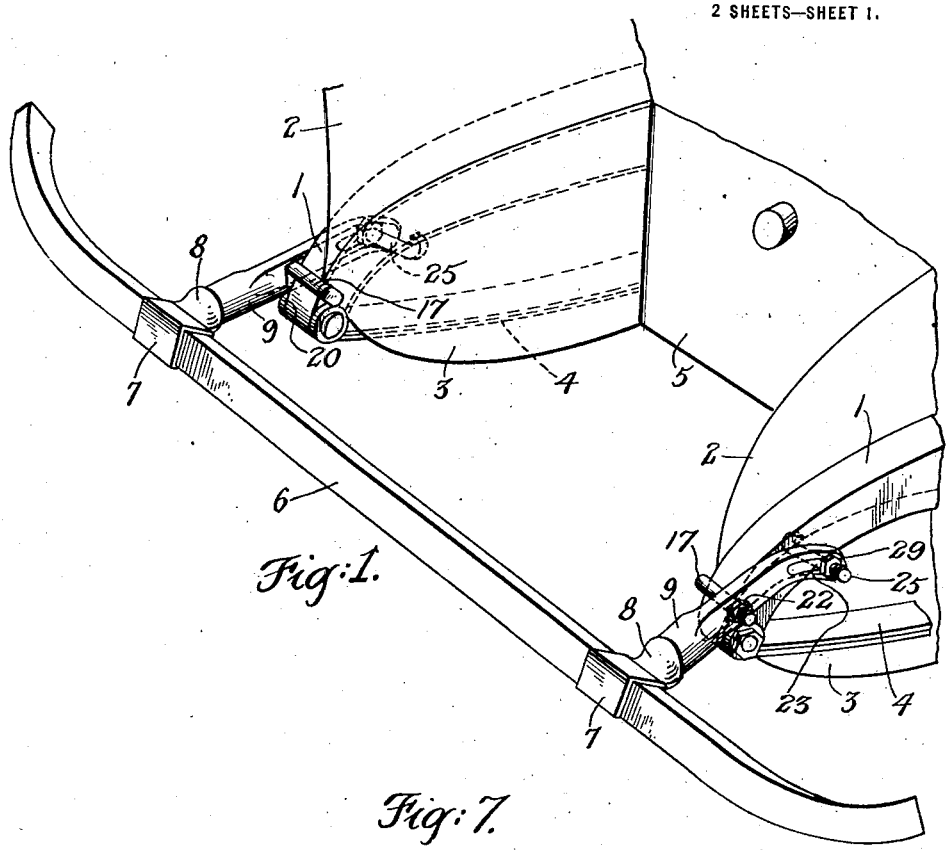
Fig:1.
Fig:7.
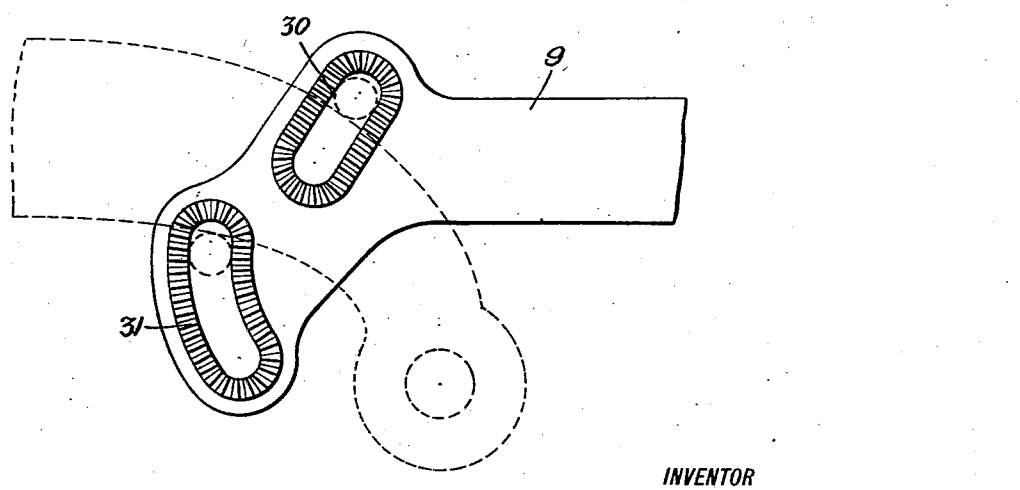
INVENTOR
Albert J. Blucker,
BY
Kenyon & Kenyon
his ATTORNEYS A. S. CLUCKER.
VEHICLE BUMPER.
APPLICATION FILED AUG. 13, 1917.
1,349,117.
Patented Aug. 10, 1920.
2 SHEETS—SHEET 2.
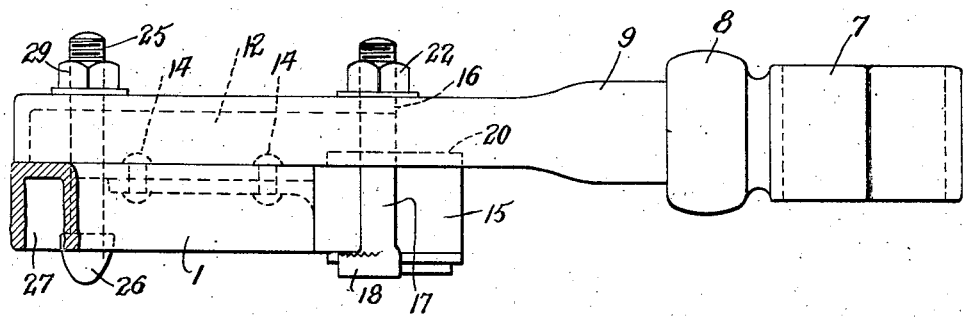
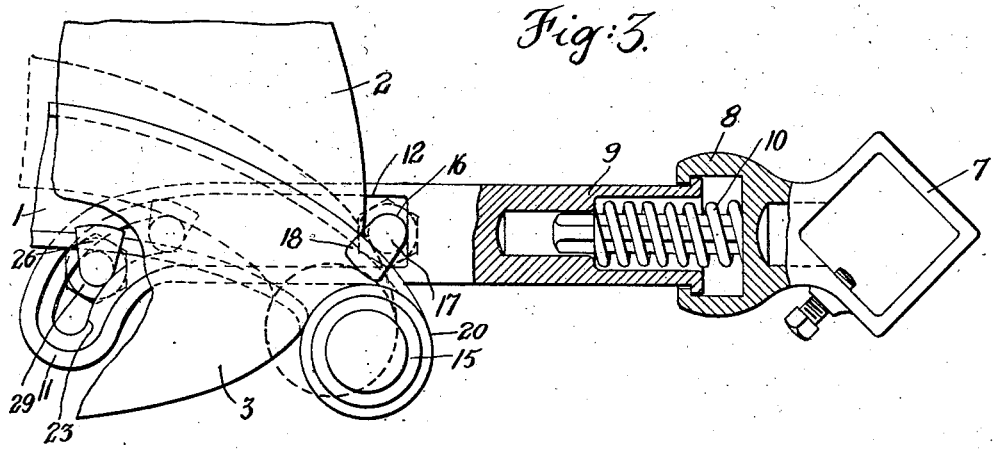
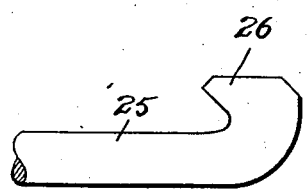
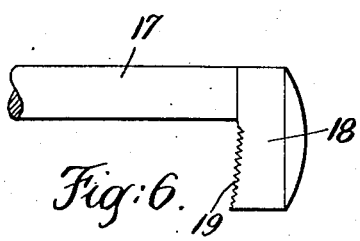
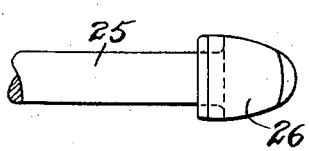
INVENTOR
Albert S. Clucker,
BY
Kenyon & Kenyon
his ATTORNEYS

UNITED STATES PATENT OFFICE.

ALBERT S. CLUCKER, OF NEW YORK, N. Y.

VEHICLE-BUMPER.

1,349,117.　　　　Specification of Letters Patent.　　Patented Aug. 10, 1920.

Application filed August 13, 1917. Serial No. 185,824.

*To all whom it may concern:*

Be it known that I, ALBERT S. CLUCKER, a citizen of the United States, and a resident of the city, county, and State of New York, have invented certain new and useful Improvements in Vehicle-Bumpers, of which the following is a specification.

My invention relates to bumpers for vehicles, and particularly to that type of bumper adapted, by reason of adjustability of parts thereof, to be mounted on vehicles having different proportions.

In many modern vehicles there is a frame member, which is supported upon an axle through springs or other devices. In such vehicles there is generally a mud-guard or fender extending over each of the wheels, and such guard or fender is provided with an extension from the outer end of the portion over the wheel downward to the outer end of the frame member. There is also a mud or splash-pan, which extends downwardly from the frame member, preferably from the top edge thereof, and it extends from the front end of the frame for a distance along the frame member. The mud or splash-pan preferably extends downwardly far enough to protect and conceal, to a certain extent, the springs and other parts of the vehicle. With the extensions of the mud-guard and the formation of the pan described, it is necessary that the brackets supporting the bumper or fender be of a special design in order that they may be fastened to the frame member without interference with or destruction of the mud-guard extensions and pan.

It is an object of my invention to provide a bumper having brackets which will make it possible to attach a bumper to a vehicle having such mud-guard or fender extensions and pan, as above described, without mutilation of or interference with the guard and pan parts.

Other and further objects and advantages of my invention will appear from the following description, taken in connection with the drawings forming part of the specification, and will be pointed out in the hereunto appended claims.

In the drawings, in which like reference characters indicate similar parts,

Figure 1 is a partial perspective view of a vehicle having a bumper embodying certain features of my invention mounted thereon;

Fig. 2 is a top plan view of one of the brackets of the bumper, shown in Fig. 1, showing its attachment to a frame member partly broken away;

Fig. 3 is a partial sectional view of the construction shown in Fig. 1;

Figs. 4 and 5 are details of one of the attaching members;

Fig. 6 is a detail of another attaching member for the bracket; and

Fig. 7 is a modification of one of the brackets.

The frame members 1 are shown, in part, in Fig. 1, and there is shown attached to them the part 2, which extends upwardly to the mud-guards which cover the wheels of the vehicle. These extensions reach down to the point of the frame members farthest from the vehicle, as shown. The mud or splash pan 3 extends downwardly from the frame and partly conceals and protects the springs 4. This pan extends from the outer ends of the frame member back to and adjoins a transverse pan or apron member 5 which extends downwardly at the end of the vehicle body.

It is evident that it is impossible to surround the frame member with attaching members for the bumper brackets without destroying or mutilating these mud-guards and pan parts, and I have described herein one embodiment of my invention which provides for the attachment of a bumper to a vehicle without mutilating or destroying the guard and pan parts.

The bumper comprises the well-known cross-bar 6 and the brackets 7. These brackets are made in two parts 8 and 9, and these parts house a spring 10, all of which construction is set out more in detail in my co-pending application for bumpers, filed Aug. 13, 1917, Serial No. 185825.

The shank portion 9 of the brackets is adapted to extend alongside the outside of one of the frame members and has a downwardly curved portion 11 on the opposite end from that with which the part 8 coöperates. This shank portion 9 has a recess 12 formed in the face thereof which lies against the frame member. This recess accommodates any irregularities in the surface of the frame member, such as the rivets 14 which attach the spring pintle bearing member 15 to the end of the frame member 1, as shown in Figs. 2 and 3. The part 9 is provided with an opening 16 which is preferably round and through which extends the attaching member 17 which comprises a shank and a head 18, preferably forming an angle, slightly less than a right angle, with the shank, as shown in Fig. 6, and provided with corrugations or teeth 19 on the inner or gripping face thereof. This attaching member 17 extends across the top of the frame member preferably at a point close to the end thereof so that the bracket member 9 may lie upon the boss 20 formed on the side of the member 15. The extension 18 hooks over the inner edge of the frame and may lie upon the downward extension of the mud-guard in case the mud-guard extends to the very end of the frame without mutilating the extension.

The frame extensions have a great variety of widths and the difference in width of these frame members is taken care of by having a long threaded portion on the member 17 so that the nut 22 thereon may be screwed upon the member 17 to a greater or less extent. The frame members also have a great variety of different curves in the vertical plane and they have a great variety of depths. These differences I take care of by providing my bracket with a curved slot 23 in the curved portion 11 thereof. As shown in Fig. 3, it is possible to arrange my bracket to coöperate properly with frames having different curvatures and depths.

Positioned within the slot 23 there is a second attaching member 25 which is provided with a wide hook-end 26 which embraces the lower flange 27 of the U-shaped section of frame member 1. The member 25 is provided, as is the member 17, with a long threaded portion so that the nut 29 may be tightened up more or less to take care of differences in width of frame members.

It is clear from Figs. 1 and 3 and from direct application to a great many vehicles that the member 17 will reach across the top of the end of a frame member and engage the inner face thereof, or engage the downward extension of the mud-guard and the attaching member 25 will extend underneath the frame member and engage the lower flange of the frame, without, in any manner, mutilating or disfiguring the mud-guard or pan parts. It is also evident from the drawings, and it has been proved by application of the bracket to a great many vehicles that by having one attaching member, preferably the one which extends across the top frame member, pass through an opening substantially of the same diameter, and by having the other attaching member, preferably the one which extends below the frame member and at a point removed from the end thereof, pass through a slot, and by providing the attaching members with the ends properly formed, it is possible to attach securely the bumper bracket and in this way attain the objects of my invention.

In Fig. 7, I have shown a modification in which the bracket is provided with two slots, the upper one, 30, preferably being straight and at an angle to the longitudinal axis of the member 9, and the other slot, 31, being curved, and preferably being positioned so as to form a different angle with the longitudinal axis of the member 9. By having the slot 30 elongated, it is possible to take care of different depths of frame members, and by having the opening 31 positioned and formed in a curve, substantially as shown, it is possible to take care of different curvatures of the frame member in a vertical plane.

With this form of bracket, I prefer to use substantially the same type of attaching members, as the members 17 and 25, heretofore described, although the parts which coöperate with the edges of the frame members may be modified according to the contour of the parts with which they coöperate.

While I have shown my construction in great detail, making reference to specific parts, I do not intend to be limited to the construction as shown, but intend that my invention shall include such variations, adaptations or modifications as may occur to those skilled in the art, and that it shall be defined by the hereunto appended claims.

Having described my invention, what I claim as new and desire to secure by Letters Patent is:

1. In a bumper, a bracket adapted to be positioned along the outside of and substantially below the top of the frame member of the vehicle, said bracket having a member extending across the top of said frame member near the end of the frame member and provided with a portion to engage the inner edge of said frame member, said bracket having a member extending across the under side of said frame member at a point removed from the end of said member and having a part engaging the inner edge of said frame member, said points of engagement being substantially in a horizontal line, said bracket having an opening in which one of said members fits substantially tightly and a curved slot in which is placed the other of said members, and means for holding a bumper, said means extending outwardly substantially in the horizontal line passing through said points of engagement.

2. In a bumper, a bracket adapted to be positioned at one side of the frame member of the vehicle and having two openings, bolts in said openings having hooked ends adapted to engage the other side of said frame member, one of said bolts being adapted to engage the upper edge of said member and the other of said bolts being adapted to engage the lower edge of said frame member so that the points of engagement are substantially in a horizontal line when said bracket is in operative position, one of said bolts being vertically adjustable, and means for holding a bumper member substantially in the horizontal line passing through the points of engagement of said bolts with said frame member.

In testimony whereof, I have signed my name to this specification.

ALBERT S. CLUCKER.